United States Patent

[11] 3,590,887

| [72] | Inventor | Harold G. Quase<br>Potomac, Md. |
|---|---|---|
| [21] | Appl. No. | 797,601 |
| [22] | Filed | Feb. 7, 1969 |
| [45] | Patented | July 6, 1971 |
| [73] | Assignee | Underwater Storage, Inc.<br>Washington, D.C.<br>Continuation-in-part of application Ser. No. 710,084, Mar. 4, 1968, now Patent No. 3,528,462 |

[54] PORT FACILITY SHIP SEWAGE COLLECTION, TRANSPORTATION AND DISPOSAL SYSTEM
15 Claims, 1 Drawing Fig.

[52] U.S. Cl. ........................................... 141/1, 61/1, 114/0.5, 137/236, 141/284
[51] Int. Cl. ........................................... E03f 1/00

[50] Field of Search ........................................... 4/1, 8, 10, 80, 114—116; 61/1; 114/0.5 T, 26; 137/236, 581; 141/1, 10, 114, 279, 284, 387, 388; 214/12, 13, 14

[56] References Cited
UNITED STATES PATENTS

| 1,406,950 | 2/1922 | Fackert | 114/0.5 T (UX) |
|---|---|---|---|
| 2,990,796 | 7/1961 | Cole et al. | 114/0.5 T |
| 3,119,407 | 1/1964 | Timmerman, Sr. et al. | 137/236 X |

*Primary Examiner*—Laverne D. Geiger
*Assistant Examiner*—Edward J. Earls
*Attorney*—Littlepage, Quaintance, Wray & Aisenberg

ABSTRACT: Port facility sewage disposal systems for large ships in port employing large collapsible waste-containing bags which are submergable and anchorable adjacent a ship and which when filled are towable to a remote location for emptying and processing are described herein.

PATENTED JUL 6 1971 3,590,887
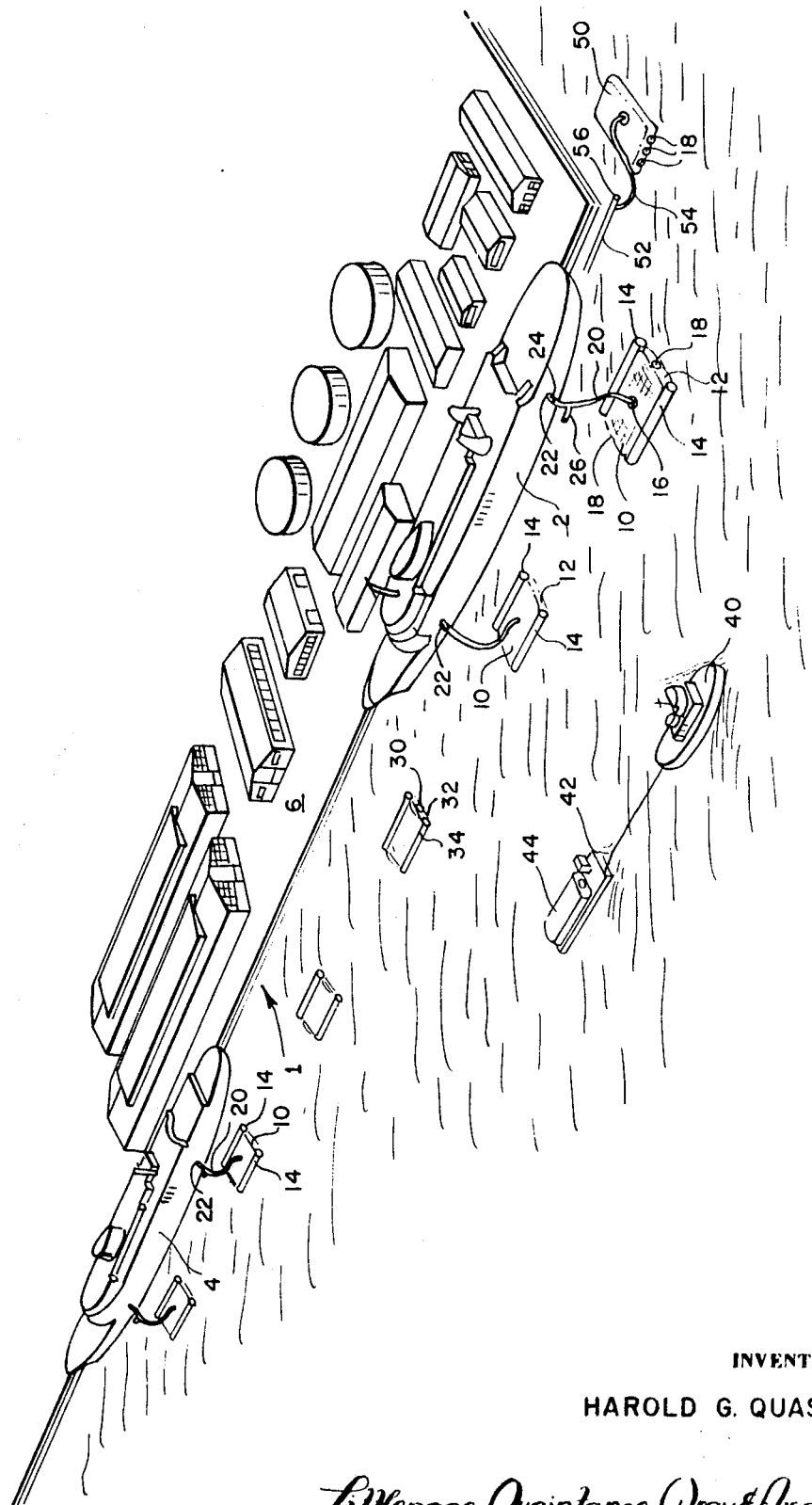
INVENTOR
HAROLD G. QUASE
Littlepage, Quaintance, Wray & Aisenberg
ATTORNEYS

PORT FACILITY SHIP SEWAGE COLLECTION, TRANSPORTATION AND DISPOSAL SYSTEM

BACKGROUND OF THE INVENTION

This is a continuation-in-part of application Ser. No. 710,084, filed Mar. 4, 1968 by Harold G. Quase for Sewage Disposal, now U.S. Pat. No. 3,528,662 which provides a permanent installation system with holding tanks for the collection and remote disposal of sewage.

Environmental pollution control has become more and more important as population and technology increase with geometric orders. Pollution of rivers, bays, harbors and coastlines, which are generally referred to herein as ports, is a matter which has increasingly received attention. It is well known that one of the great sources of water pollution in and around port facilities is the effluent which is jettisoned from large seagoing ships.

Most ports and local jurisdictions have passed laws preventing the ejection of materials from ships while in port, but the storage of some materials aboard ship is not provided for in most ship designs. Moreover, the storage of materials, such as sewage and garbage, aboard a ship may create unpleasant odors and health hazards to shipboard personnel, passengers and persons in the port area. While laws have been effective in preventing the pumping of bilges and perhaps the dumping of garbage in bays, rivers and harbors, no laws have been successful in preventing large oceangoing ships from discharging sewage into the port waters. Thus, large ships are responsible to a great extent for the continued pollution of harbors through the ejection of sewage. Moreover, no satisfactory means has been provided other than the use of service craft or lighters for the disposal of garbage while in port or in bays.

SUMMARY OF THE INVENTION

The present system provides method and apparatus for collecting sewage in collapsible containers while ships are in port, and for submerging and anchoring those containers adjacent ships tied up at docks, for raising and transporting the containers and for emptying the containers at remote locations.

Preferably, the containers are made of collapsible bags of reinforced cloth, plastic, rubber or rubberlike material. Alternatively, the tanks may be made of rigid collapsible sections, such as shown in Quase U.S. Pat. No. 3,187,793, issued June 8, 1965. The tanks may be made towable, for example, as shown in Quase U.S. Pat. No. 3,114,384, issued Dec. 17, 1963, and may be anchored, such as described in Quase U.S. Pat. No. 3,155,280, issued Nov. 3, 1964.

In a preferable method for carrying out of the invention, collapsed tanks are hauled or towed to positions adjacent docked ships and are connected to the ships by long flexible hoses which are provided at first ends with fittings for connection to sewage discharge ports of ships and which are provided at second ends with fittings for connection to inlets of the containers. In a preferred form, hoses have conventional one-way valves permitting the flow of liquid, gas or slurries in a single direction, towards the containers. For large ocean vessels, containers from about 5,000 to 30,000 cubic feet capacity are suitable, depending on the number of tanks attached to each ship and the operation of its sewage system.

The containers are attached to platform supports having anchoring means, and chambers of the platform supports are flooded to submerge the entire assemblies with the attached containers. Alternatively, the assemblies are hauled downward to the harbor floor. Suggested methods of anchoring are described in detail in Quase U.S. Pat. Nos. 3,155,280, 3,114,384 and 3,187,793. The containers may be attached to anchoring devices and allowed to submerge under the influence of their own weight; weights or anchors may be attached to the containers to submerge them, or the containers may upon the surface of the water adjacent the ships and may be automatically submerged under their own weight as the containers are filled.

The containers are at points below discharge ports of the ships, so that effluents may pass directly into the containers under the influence of gravity. When the containers are submerged, water pressure exerts inward force on the containers. External pressure is balanced by the pressure of the waste material within the containers, and the columns of waste material which extend downward through the tubes connecting the ships and the containers sustain the pressures inside the containers so that internal and external pressures equalize. The slight additional height between the waterline and the discharge ports on the ships provide the additional head that is necessary to fill and expand the collapsible containers against external water pressure.

Flexible tubes in preferred embodiments extend laterally outward from ships and downward to the bags. Tubelike extensions extend through the bags so that material is exhausted near the bottoms of the bags. The bags are vented by separate small tubes which extend through the upper surfaces of the bags and lead upward to the surface of the water. Besides carrying off gaseous decay products, the vent tubes insure that the bags do not become buoyant due to collection of gas. The vent tubes further aid in the sinking of the bags by allowing residual air to be squeezed out of the collapsed container as they submerge. The small diameter vent tubes may be attached to the large diameter sewage tubes with means provided to maintain the open ends of the vent tubes at distances from the sides of the ships.

When ships are ready to leave port, the waste disposal tubes may be disconnected and cast off to float freely on the surface of the water. After the ships have moved from their berths, the vents from the containers may be restricted, causing the bags to fill with gaseous decay products, which in turn causes the bag to rise to the surface of the water for loading on barges or for towing to remote disposal points. Alternatively, air may be pumped into the bags to raise them from the bottom, or tanks of the anchoring frames may be blown down to cause the frames and bags to rise to the surface. The hoses, which will still contain some effluent, remain connected to the bags while the containers are being transported to the discharge points. The remote locations comprise sewage treatment plants, which may be located offshore, or which may be located onshore, with appropriate evaporation lakes.

In one embodiment of the invention, incoming ships stop adjacent offshore sewage treatment stations and are outfitted with collapsed tanks, which are connected to the sewage discharge ports of the ships. The tanks are made fast to the ships, and the ships proceed into port, where the tanks are released to sink alongside the ships under their own weight. Before the ships leave port, the partially filled tanks are hauled close aboard and made fast to the ships. Upon passing the sewage treatment station, the ships disconnect the tanks from the discharge ports after having restricted the tank vents, and the floating tanks are picked up and taken to appropriate discharge points by service vessels and are made ready for the next pickup.

Alternatively, tugs carry the containers back and forth between ports and sewage treatment stations. In the latter embodiment, extremely large bags may be connected to permanent sewage systems which are submerged adjacent docks so that several ships may be connected to a single sewage line in the manner shown in the application Ser. No. 710,084 of Harold G. Quase. Large collapsible tanks are towed to the collection points at ends of permanent sewage pipes and are connected to the pipes through flexible hoses. When the tanks have been filled, as evidenced by effluent flowing from the vent tubes, or in times programmed according to the size and type of vessels moored at the docks, the large filled containers are raised and towed to remote discharge points.

The contents of the tanks may be pumped into treatment facilities, or sea cocks may be opened, and the tanks may be emptied at sea. After emptying, the tanks may be hosed out, or the containers may be towed through the ocean with forward and aft access ports open to flush the containers.

The containers are provided with one or more outlet openings at each longitudinal end. When containers are to be flushed or cleaned by towing, at least three large accesses are preferred at each end. Each access or outlet opening has a diameter or transverse dimension of about from 1 to 5 feet. Pressure differentials between the bag interior and exterior are not great. Conventional naval port or hatch cover fittings may be employed with metallic covers and rings secured to the bags about the access openings. Bayonet-type hatch couplings may be employed.

Preferably, the containers have one large central access opening in the top of the bag. To that opening there is affixed a tube which extends downward to a point displaced from the bottom of the bag so that materials may be deposited in the bottom and flow outward and upward so any air or gas may pass to the top. A quick hose coupling, for example a bayonet coupling, joins the external flexible feeding and the central access opening. A vent hose extends through the bag surface and may be connected to the hose coupling so that the feeding tube and vent may be connected in one movement.

While this invention is primarily intended for use with the disposal of raw sewage emanating from ships, it is useful with all forms of waste material which may be generated near a waterway, whether the materials come from sources on the land, or from ships, craft or small vessels. The waste material may be ground and fluidized garbage, waste oil, spent reactor fuel, used radioactive material, or any other form of waste which is capable of being fluidized to flow into collapsible containers. In one particularly useful form of the invention, sewage is condensed by evaporation and is placed in large containers while still in slurried form, notwithstanding that a substantial portion of the liquids has been removed. The condensed slurried material is then flowed into the large collapsed containers which fill and expand and are readied for towing to a remote location for disposal for further treatment of the slurry.

This invention has as one objective the provision of a port facility waste collection, transportation and disposal method which employs collapsible containers for connecting to sources of waste by flexible tubes, so that the containers may be submerged, filled, raised and towed away to a remote waste treatment station.

Another objective of this invention is the provision of a process having sequential steps for the collection, transportation and remote disposal of waste material, particularly sewage from harbors.

A further objective of this invention is the provision of a method for the prevention of harbor water pollution by connecting collapsible and submergible sewage-receiving containers to ships when in port, submerging the containers and anchoring the containers adjacent the ships, raising the containers when full and towing the containers to remote disposal locations.

This invention has as another objective the provision of collapsible sewage-receiving containers having inlet and outlet connections and comprising reinforced bags having generally rectangular cross sections.

Another objective of this invention is the provision of collapsible-container submerging, anchoring and raising devices which have container securing means, bottom anchoring means and spaced and parallel floodable chambers for mounting the containers therebetween.

These and other objectives of the invention will be apparent from this specification, which includes the abstract, background, summary, descriptions of preferred embodiments and claims, and from the drawings which together form the disclosure of the invention.

BRIEF DESCRIPTION OF THE DRAWING

The drawing depicts preferred embodiments of a waste collection system which shows mounting collapsed reinforced bags to anchoring devices, and connecting the bags through flexible hoses to ship sewage ports, directly or via permanent sewer lines, and raising filled bags and towing them to remote disposal facilities.

DETAILED DESCRIPTION OF THE DRAWING

A port facility is generally indicated by the numeral 1. Ships 2 and 4 are docked at spaced berths along pier 6, an additional berth is provided between the positions of ships 2 and 4. Sewage collection containers generally indicated by the numeral 10 are attached to platforms 12 which are sunk alongside ships 2 and 4. Floodable tanks 14 are connected to either side of containers 10 so that the containers may be attached to the tanks and the tanks may be flooded to submerge the containers. The weight of the flooded tanks of the containers holds the containers in place on the bottom of the body of water. Alternatively, the containers 10 or platforms 12, which comprise the tanks 14, may be anchored to the bottom and the containers and platforms may be close hauled to the anchors to hold the assemblies in place. Tanks 10 have inlet means 16 and outlet means 18 for the filling and removal of waste. Flexible tubes 20 connect inlets 16 with waste discharge ports 22 in the hulls of the vessels 2 and 4. Preferred fittings 24 on upper ends of hoses 20 are universal expanding fittings of conventional design which may be fitted into ports 22 and expanded therein to hold the hose firmly in place and to insure that all effluents issuing from ports 22 are passed into the hoses. Vent tubes 26 are attached to hoses 20 and run downward along the hoses and are connected through inlet 16 to a point just below the inner surface of the collection bags 10. Hoses 20 or extensions thereof which are associated with inlets 16 run to the bottom of the bags 10. Preferably the upper ends of vent tubes 26 are displaced laterally from the ships so that odors from the containers are not emitted in the immediate vicinity of the ships. Alternatively, the vent tubes 26 may be floated a distance away from the hose 20 and from the ships.

As shown opposite the vacant berth along dock 6 between ships 2 and 4, a collapsed container 30 has been attached to an anchoring device 32 which comprises floodable tanks 34.

As shown in the drawing, a tug 40 is towing a barge 42 on which a filled waste container 44 has been placed. As an alternative to the use of the barge 42, the containers 44 may be configured and outfitted for towing and for sustaining their own buoyancy.

In an alternative embodiment of the drawing, a large collapsible, submergible and towable container 50 is anchored at one end of the dock. A rigid pipe 52 is positioned alongside of the dock, and a first flexible hose 54 connects a lower end of pipe 52 with the container 50. As is conventional, the pipe 52 has an access end 56 for cleaning purposes. Remote ends of pipes 52 are connected to second flexible hoses not shown, which are connected to discharge ports of ships along the dockside.

In one embodiment of the method of this invention, ship 2 may stop outside of the port facility 1 near a deep sea sewage treatment station. Containers 10 are made fast to the ship and hoses 20 are connected to the containers and to the ships sewage discharge ports 22. The ship hauls the collapsed containers into the port where submerging and anchoring platforms 12 are attached to the containers. Before the ship leaves its berth, hoses 20 are disconnected from ports 22 and service vessels raise the containers and tow them to sea or to the sewage treatment station for evacuation. In an alternate embodiment of the method of the invention, service vessels such as tug 40 connect the ships to the containers as soon as the ships are berthed.

Various modifications and embodiments of the method and apparatus of the present invention are apparent from the disclosure. While the invention has been particularly shown and described with reference to preferred embodiments thereof, it will be understood by those skilled in the art that various changes in form and details may be made therein without department from the spirit and scope of the invention.

That which I claim is:

1. A port facility waste collection, transportation and disposal method, comprising the steps of:
submerging and positioning collapsible containers in a collapsed condition below a level of a source of waste,
connecting a source of waste to the collapsed container through a hollow tube,
passing waste from the source of waste through the hollow tube into the container,
raising the container, and disconnecting the container and source of waste,
removing the container to a remote location, and emptying and collapsing the container.

2. The port facility waste collection, transportation and disposal method of claim 1 wherein the submerging and connecting steps comprise connecting a flexible tube to the collapsed container and to a source of waste prior to submerging the container, and submerging, positioning and anchoring the container beneath a surface of water in the port.

3. The port facility waste collection, transportation and disposal method of claim 1 wherein the submerging and positioning step comprises attaching the collapsed container to submerging and anchoring means, and submerging and positioning the means with the container attached thereto.

4. The port facility waste collection, transportation and disposal method of claim 3 wherein the submerging and raising steps comprise respectively flooding and blowing down tanks on the submerging and anchoring means.

5. The port facility waste collection, transportation and disposal method of claim 1 wherein the filling step further comprises venting the container, and wherein the raising step further comprises restricting the venting of the container.

6. The port facility waste collection, transportation and disposal method of claim 1 wherein the moving step comprises towing the container to a remote location.

7. The port facility waste collection, transportation and disposal method of claim 1 wherein the connecting step comprises connecting a rigid tube through a first flexible tube to a collapsed container and through a second flexible tube to a source of waste.

8. Apparatus comprising port facility means for collecting, transporting and disposing of waste, the apparatus comprising (a) an imperforate collapsible, submergible and towable container with vent means and having at least two openings in opposite ends of and suitable for flushing the container and separate waste inlet means connected to the container and (b) tube means having a first end connected to the waste inlet means and having a second end with means for connection to a waste exhaust port of a source of waste.

9. The port facility waste collection, transportation and disposal apparatus of claim 8 wherein the container comprises a substantially flexible reinforced bag defining generally rectangular cross sections.

10. The port facility waste collection, transportation and disposal apparatus of claim 8 further comprising submerging and anchoring platform means connected to the container.

11. The port facility waste collection, transportation and disposal apparatus of claim 10 wherein the platform means comprises spaced parallel floodable tanks positioned on opposite sides of the container.

12. The port facility waste collection, transportation and disposal apparatus of claim 8 further comprising submerging and anchoring floodable tanks connected to opposite sides of the container.

13. Apparatus according to claim 8 wherein the vent means is attached to the tube means.

14. Waste collection apparatus comprising an imperforate collapsible, submergible container, waste inlet and discharge means connected to the container and tube means which comprises a permanently installed dockside collection pipe having first and second ends respectively connected to first and second flexible hoses, the first flexible hose having a first end connected to the waste inlet means of the collapsible container and having a second end connected to the collection pipe, the second flexible hose having a first end connected to the collection pipe remote from the first hose and having a second end with means for connection to a waste exhaust port of a source of waste.

15. A vessel in a port and having a waste discharge port in combination with apparatus comprising (a) an imperforate collapsible, submergible and towable container with vent means for carrying off gaseous decay product and communicating with the interior of the container and having waste inlet means and separate discharge means connected to the container and (b) tube means having a first end connected to the waste inlet means and having a second end connected to the waste discharge port of the vessel.